May 25, 1954
I. NESSON
2,679,065
WINDSHIELD WIPER BLADE
Filed May 13, 1949
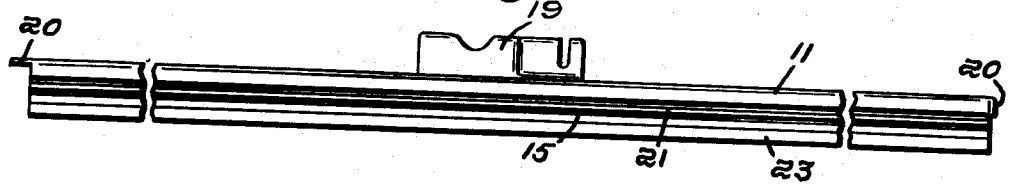
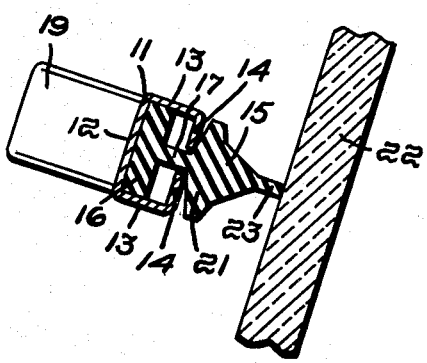
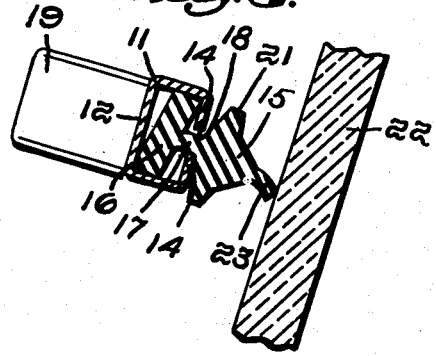
Inventor:
Israel Nesson,
by Thomson + Thomson
Attorneys

Patented May 25, 1954

2,679,065

UNITED STATES PATENT OFFICE 2,679,065

WINDSHIELD WIPER BLADE

Israel Nesson, Lynn, Mass., assignor to
Max Zaiger, Swampscott, Mass.

Application May 13, 1949, Serial No. 93,009

2 Claims. (Cl. 15—245)

This invention relates to windshield wiper blades, and pertains more particularly to improvements in blades or wipers having a flexible rubber wiping strip held in a metal holder equipped with a connector or clip by which the blade is separably attached to the end of an oscillating wiper arm.

Heretofore, the flexible rubber strips of windshield wiper blades have been rigidly clamped along their upper margin or rib within a metal shell or holder having flaring sides, and the clip or connector has been pivotally mounted on the back of the holder to permit adequate rocking action of the blade with respect to the wiper arm, when the blade reaches the end of its oscillating movement and then tips or tilts angularly with respect to the windshield for the reverse movement. The blade holder, as well as the tightly gripped wiper element, thus tilts over at each rocking movement; the pivoted clips or connectors are noisy in operation; and the hinged connection between the blade holder and connector is subject to binding because of rust, wear, or dirt.

It is accordingly the principal purpose of the present invention to provide a wiper blade in which the upper margin or rib of the flexible rubber wiper is loosely supported in the metal shell or holder and is hence free to move transversely of the holder, in a direction toward and from the windshield, during operation. This arrangement not only increases the effective flexibility of the wiper strip and permits the use of a clip or connector which is rigidly attached to the back of the metal holder without diminishing the desired rocking or tilting action of the wiper strip during oscillation, but also permits the holder or shell to move in a plane substantially parallel to the surface of the windshield.

As is well understood, when the wiper blade reaches one end of its oscillating movement and the flexible strip rocks or tilts from one angular position to the other, the wiper strip assumes a position substantially at right angles to the windshield at each reversal of its movement. When the rubber strip is rigidly clamped in the metal shell or holder, the holder and the attached end of the wiper arm are thus moved away from the windshield at each end of the stroke, and the holder does not travel in a plane parallel to the windshield surface. Inasmuch as the wiper arm is spring tensioned to press the blade against the windshield, more operating power is required when the blade holder must move toward and from the windshield during operation of the prior devices.

Additional features and advantages of the improved wiper blade will be apparent from the following description of the recommended embodiment of the invention shown in the accompanying drawings, and will be pointed out in the appended claims. It will be understood, however, that the structural details of the devices herein shown and described may be varied to suit particular conditions without departing from the essence of the invention as defined in said claims. In the drawings, Fig. 1 is a side elevation, partly broken away, of a windshield wiper blade constructed in accordance with this invention, a retaining tab at one end of the holder being shown in open position to indicate how the rubber wiper strip may be inserted in the holder;

Fig. 2 is an enlarged transverse section through the wiper blade showing the position of its elements at the time the wiper strip is at right angles to the windshield, at the reversing position of its oscillating stroke; and Fig. 3 is a view similar to Fig. 2 showing the relative position of the blade holder, the wiping strip and the windshield, at a point intermediate the ends of the wiping stroke.

In the form chosen for the purpose of illustration, the improved wiper blade comprises a rigid holder or shell 11, preferably stamped or shaped from sheet metal to provide a flat top 12, parallel depending sides 13 and inturned longitudinal bottom flanges 14, forming a longitudinal chamber or channel approximately rectangular in cross section; a flexible wiper strip 15, of rubber or other suitably resilient material, having a longitudinal marginal portion or bead 16 receivable endwise within the chamber of the holder, and connected to the head 15 of the wiper strip by a narrow, longitudinal neck 17 received in the slot 18 between the spaced, opposed edges of the flanges 14 of the holder 11; and a clip or connector 19 mounted on the back of the holder 11.

The holder back 12 has end tabs 20 normally bent downwardly to provide stops for preventing or limiting endwise movement of the wiper strip with respect to the holder, after the strip bead 16 has been telescopically inserted in the holder chamber or channel while one of the tabs 20 is in open position, as indicated at the left of Fig. 1. It will be understood that said tab will be closed by bending it downwardly (to the position shown at the right of Fig. 1) to retain the rubber strip in the holder of the completed blade.

The wiper bead 16 is substantially rectangular in cross section. The width of the bead is preferably slightly less than the width of the holder channel, and the thickness of the bead is substantially less than the depth of the channel, as shown in Figs. 2 and 3, so that the rubber strip is loosely retained in the holder and is movable transversely, in the direction of the windshield and also as angularly, with respect to the holder during oscillating operation. The thickness of the neck 17 of the wiper strip is appreciably less than the slot 18 between the opposed inturned bottom flanges 14 of the holder, and the depth of the neck portion is sufficient to permit the bead 16 to move transversely as well as angularly within the holder channel.

The head of the wiper strip is provided with longitudinal shoulders or flanges 21, inclining outwardly from the bottom of the neck portion 17 and disposed to engage the respective bottom flanges 14 of the holder and provide a cushion seat limiting angular movement of the strip 17 with respect to the holder 11 during oscillation of the blade on the windshield 22. The bottom edge of the wiper strip provides a relatively thin longitudinal fin 23 which wipes across the surface of the windshield 22.

When the wiper blade is in normal operating position, as shown in Fig. 3, the flexible wiping head 15 is inclined with respect to the windshield, and the bead 16 assumes a transversely inclined position within the channel of the holder 11, one of the wiper shoulders 21 engaging one of the bottom flanges 14 of the holder. In such position, the inward pressure of the wiper arm is transmitted directly from the holder flange 14 to the wiper shoulder 21. The bead 16 is thus free from operating pressure, and the resistance or drag of the wiper bead fin 23 on the windshield tends to pull the bead toward the bottom of the holder channel, as the neck portion 17 is twisted and stretched on one side by the combined effect of the arm pressure and windshield drag.

When the blade reaches the end of its stroke and rocks over for the reverse stroke, the wiper strip temporarily assumes a position at right angles to the windshield, as shown in Fig. 2, and the bead 16 is then moved upwardly in the channel to engage the back 12 of the holder. Owing to the freedom of transverse movement of the bead 16 in the holder channel, the effective flexibility of the wiper strip is enhanced and the holder moves in a plane substantially parallel to the surface of the windshield and is not forced appreciably away from the windshield at the end of the stroke when the wiper reverses its rocking tilt.

It will be observed, moreover, that the improved holder 11 affords adequate lateral rigidity of the wiper strip 15, without tightly clamping the strip in its channel, and that the inwardly bent bottom flanges 14 bring the longitudinal edges of the holder into spaced opposition and thus avoid the sharp outwardly projecting edges which are characteristic of conventional blade holders and which tend to scratch the windshield when the blade is tilted.

It will also be understood, as aforesaid, that the clip or connector 19 may be rigidly attached to the back 12 of the blade holder. The mode of attachment of the clip, as well as the construction thereof, is, however, immaterial to the present invention.

A wiper blade constructed as herein described is simple and economical to manufacture and assemble, durable and efficient in use, and provides a wiper strip which is inherently flexible and also movable transversely of its holder, in the direction of the windshield to which the blade is operatively applied. The extent to which the wiper strip flexes or tilts with respect to the holder is influenced not only by the inherent flexibility of the narrow neck 17, but also by the freedom of transverse and angular movement of the bead 16 within the holder channel. This movement is limited and controlled by the cushion shoulders 21 which alternately engage the respective holder flanges during oscillation of the blade by the wiper arm. Between the end limits of oscillating movement, the pressure of the wiper arm is transmitted to tilted wiping edge 23 of the blade through one of the holder flanges 14 and one of the cushion shoulders 21, as aforesaid. The bead 16 receives and transmits pressure only when the blade is at the point of reversing its movement, as shown in Fig. 2.

I claim:

1. A wiper blade comprising a holder having a substantially flat back portion connectable to a wiper arm, depending side portions and inwardly directed bottom flanges disposed in spaced parallel relation to said back portion, providing an interior, longitudinal channel, the opposed edges of said flanges being disposed in spaced parallel relation and forming a longitudinal bottom slot, the bottom faces of said flanges being substantially flat and in the same plane, a flexible wiper strip having a transversely flanged longitudinal bead, a transversely flanged longitudinal head, and a relatively thin connecting neck between the bead and head, the bead and neck being loosely receivable in said channel and slot respectively when the wiper strip is slid endwise into the holder, the thickness of said bead being substantially less than the depth of said channel whereby the bead is transversely movable in said channel toward and from said slot during operation of the blade, said flanged head having laterally projecting shoulders formed with flat surfaces respectively engageable with the flat bottom face of one of said flanges to limit lateral flexing of the wiper head with respect to the holder, and means restraining longitudinal movement of said strip in said holder channel.

2. A wiper blade comprising a holder having a substantially flat back portion, substantially parallel sides and inwardly directed bottom flanges disposed in spaced parallel relation to said back portion, providing an interior channel substantially rectangular in cross-section, the opposed edges of said flanges being disposed in spaced parallel relation, said flanges having flat bottom surfaces disposed substantially in the same plane, and a flexible wiper strip having a transverse bead receivable endwise in said channel and loosely retained therein, the thickness of the bead being substantially less than the depth of the channel, whereby the bead may move transversely and angularly therein, said strip having a relatively narrow neck portion received in the space between said flanges and movable transversely of the holder in said space, and having a longitudinal head provided with laterally projecting shoulders having inclined, flat surfaces respectively engageable with the flat bottom surfaces of one of said flanges to limit lateral flexing of said strip with respect to said holder, and means for restraining longitudinal movement of said strip in said holder channel.

References Cited in the file of this patent

UNITED STATES PATENTS

| Number | Name | Date |
|---|---|---|
| 970,563 | Schwalen | Sept. 20, 1910 |
| 1,706,053 | Bussinger | Mar. 19, 1929 |
| 1,789,636 | Oberti | Jan. 20, 1931 |
| 2,025,888 | Olivero | Dec. 31, 1935 |
| 2,128,454 | Cullin | Aug. 30, 1938 |
| 2,596,063 | Anderson | May 6, 1952 |

FOREIGN PATENTS

| Number | Country | Date |
|---|---|---|
| 456,189 | Great Britain | Nov. 4, 1936 |